US 7,805,462 B2

(12) United States Patent
Dupont et al.

(10) Patent No.: US 7,805,462 B2
(45) Date of Patent: Sep. 28, 2010

(54) PORTFOLIO MANAGEMENT METHODS, SYSTEMS, AND COMPUTER PROGRAMS

(75) Inventors: Kay Dupont, Otfen (DE); Eva Eisenmann, Munich (DE); Dietmar Kaiser, Wiesloch (DE); Kurt-Ulrich Otte, Blederitz (DE); Volker Zimmermann, Mannheim (DE)

(73) Assignee: SAP AG, Walldorf (DE)

( * ) Notice: Subject to any disclaimer, the term of this patent is extended or adjusted under 35 U.S.C. 154(b) by 690 days.

(21) Appl. No.: 10/924,827

(22) Filed: Aug. 25, 2004

(65) Prior Publication Data

US 2005/0114248 A1 May 26, 2005

(30) Foreign Application Priority Data

Aug. 29, 2003 (EP) ................... 03019748

(51) Int. Cl.
G06F 17/30 (2006.01)
G06F 7/00 (2006.01)

(52) U.S. Cl. ..................................... 707/802

(58) Field of Classification Search ............. 707/104.1, 707/101, 102, 802; 705/35, 37
See application file for complete search history.

(56) References Cited

U.S. PATENT DOCUMENTS

| 5,781,911 | A | | 7/1998 | Young et al. | |
|---|---|---|---|---|---|
| 5,809,483 | A | * | 9/1998 | Broka et al. | 705/37 |
| 6,208,990 | B1 | | 3/2001 | Suresh et al. | |
| 6,453,339 | B1 | * | 9/2002 | Schultz et al. | 709/206 |
| 6,490,590 | B1 | | 12/2002 | Fink | 707/100 |
| 2003/0018616 | A1 | * | 1/2003 | Wilbanks et al. | 707/2 |
| 2003/0208422 | A1 | * | 11/2003 | Burczyk | 705/35 |

OTHER PUBLICATIONS

Paul Winsberg, "Modeling the Data Warehouse and Data Mart," InfoDB, vol. 10, No. 3, Jun. 1996, pp. 1-10.
Surajit Chaudhuri et al., "An Overview of Data Warehousing and OLAP Technology," Sigmod Record, Sigmod, New York, NY, vol. 26, No. 1, Mar. 1997, pp. 65-74.
Mukesh Mohania et al., "Advances and Research Directions in Data Warehouse Technology," Avis. Australian Journal of Information Systems, Wollongong, AU, vol. 7, No. 1, Sep. 1999, pp. 41-59.
J. Hill et al., "Data Transformation: Key to Information Sharing," Gartner Group Strategic Analysis Report, Sep. 29, 1998, pp. 1-60.

* cited by examiner

Primary Examiner—Kuen S Lu
(74) Attorney, Agent, or Firm—Finnegan, Henderson, Farabow, Garrett & Dunner, LLP

(57) ABSTRACT

Portfolio management methods, systems, and computer programs are provided for allowing users to extract content out of an online transaction processing system into a portfolio management system database using a data warehouse as a filtering device in an integrated database system. Data sets from the online transaction processing system may be received into the data warehouse, where the received data sets are filtered. The filtered-out data sets may then be provided to the portfolio management system database, where they may be stored.

14 Claims, 3 Drawing Sheets

PORTFOLIO MANAGEMENT METHODS, SYSTEMS, AND COMPUTER PROGRAMS

DETAILED DESCRIPTION

1. Field of the Invention

The present invention relates in general to data management methods and systems and, more particularly, to methods and systems for providing data sets to a portfolio management system database.

2. Background Information

Enterprise database systems can be divided into two categories: operational and informational. Operational databases function as repositories for data produced by online transaction processing systems of the manufacturing, production, and transactional systems. On the other hand, informational databases store data for use in decision support and information processing systems. Informational databases include data warehouses and portfolio management system databases.

Data warehouses, like for example the SAP Business Warehouse (BW), were designed and developed as a solution to the problem associated with users submitting queries directly to an online transaction processing system and, thus, slowing down the performance of the online transaction processing system, which may require a minimum guaranteed response time with uninterrupted availability. This problem, along with the risks associated with giving the extended e-business enterprise direct access to the online transaction processing system, creates the need to store data in an environment that is not only optimized for business analysis and reporting, but also for secure broad access.

U.S. Pat. No. 6,490,590 (Fink) discloses a method and system for improved data modelling, extraction and loading routines where a detailed description of the prior art extraction and loading technique and the related prior art problems are included.

Portfolio management systems with databases were developed for specialized informational purposes in order to support managers in their strategic decisions, like for example the SAP Real Estate portfolio management system. The dynamic nature of today's market has caused portfolio management to evolve into an increasingly complex environment. It typically involves the utilization of a variety of tools covering a wide range of functions. A typical portfolio manager must stay abreast of changing market conditions and numerous factors related to the portfolios they manage. These factors include knowing the most recent portfolio's status, as well as changes in the risk profile of a portfolio due to, for example, changing market conditions or risk attributes. Thus, it is crucial to have the most recent data available for decision making and for the successful management of the portfolios.

In the prior art however, the manually inputted data that was available to the portfolio management system was often delayed and inconsistent with the online transaction processing system data. Good quality integrated data available in data warehouses after the extraction from the online transaction processing system was not available to the portfolio management system. Accordingly, there is a need for improved systems and methods for providing data to a portfolio management system.

SUMMARY OF THE INVENTION

Embodiments consistent with the present invention include systems and methods for updating a portfolio management system database with data retrieved from an online relational database by using a data warehouse as a filtering device in an integrated database system. A program module for filtering out predetermined data sets may determine the structure of the extracted content, and the determination of the structure of the extracted content may involve mapping a data structure defined in the data warehouse schema to a data structure supported by the portfolio management database.

Embodiments of the present invention may make available an integrated data standard within each data warehouse system, for use in the portfolio management system, allowing for the advanced analysis and reporting based on the consistent data. Thus, since the integrated databases of online transaction processing, data warehouse and portfolio management system may use the same data, the duplication of data is avoided. Also, embodiments of the present invention may enable portfolio managers to make decisions faster and, thus, achieve considerable cost savings.

Since, generally, the data must be mapped before it can be extracted and transformed, a transformation may have to be defined for all data from each data source. Such a transformation may include mapping data from source objects onto target objects and, optionally, applying conversions to the data. After the transformations have been defined, then scripts for converting and loading data into target objects at run time, when so requested, may be generated.

In the prior art, a transformation had to be defined for the online transaction processing data, in order to make possible mapping onto the target objects in the data warehouse system. In embodiments of the present invention, the data may be mapped from data warehouse objects onto the portfolio management system objects in order to make extraction for portfolio management possible.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention. In the drawings:

DESCRIPTION OF THE EMBODIMENTS

The claimed invention is applicable to many different industries. One skilled in the art will appreciate that the various embodiments and concepts of the present invention are applicable to a plurality of industries without straying from the spirit of the present invention.

Figure 1:
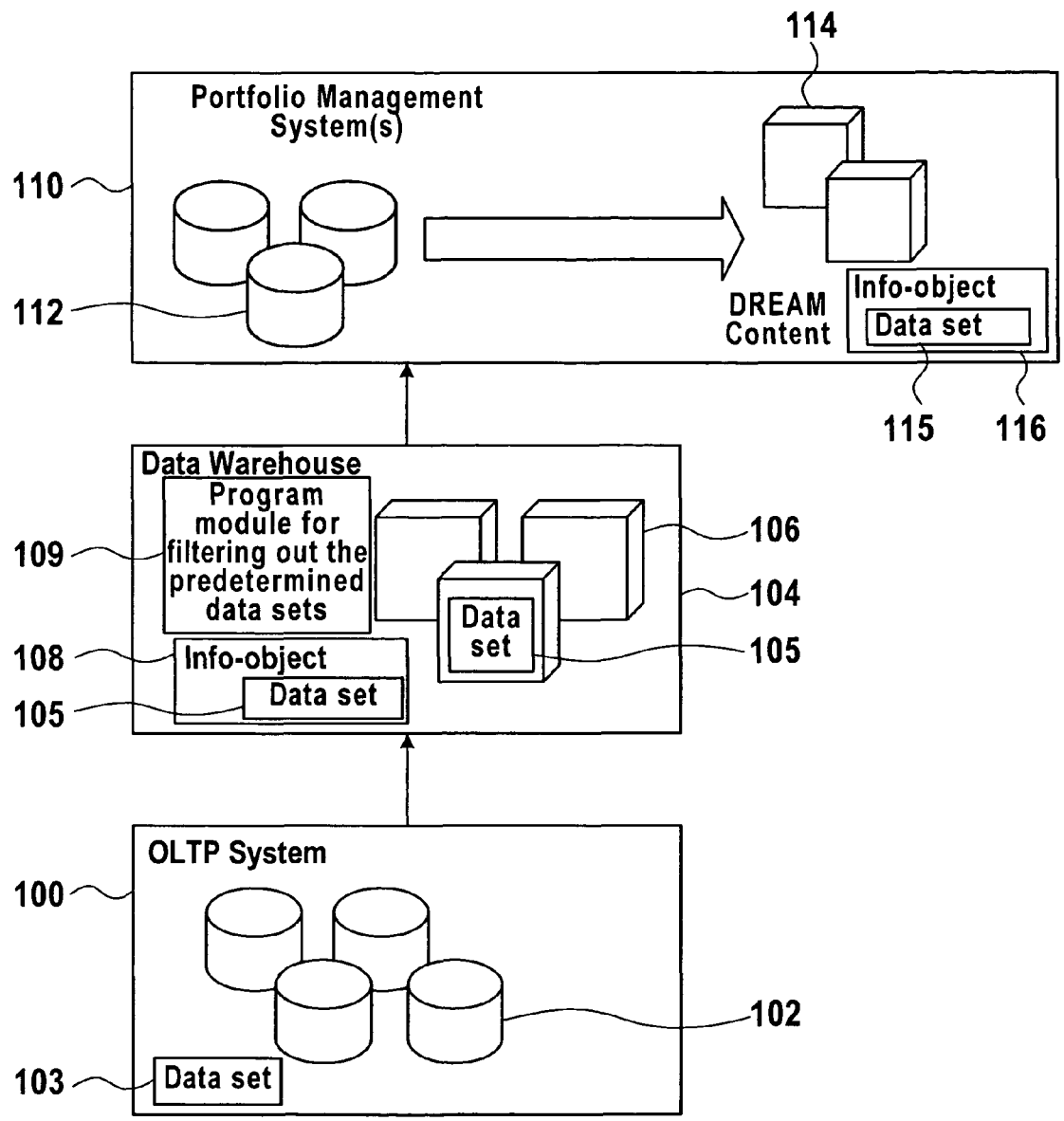
FIG. 1 is a block diagram of an exemplary integrated database system where data sets received from an online transaction processing system are filtered out using a data warehouse and made available to a portfolio management system, consistent with certain aspects of the present invention.

FIG. 1 illustrates a block diagram showing an exemplary integrated database system where data sets are provided to a portfolio management system database. The integrated database system may comprise an online transaction processing system (OLTP) 100 that may further comprise one or more tables 102 each configured to store a plurality of data sets 103. The data sets may undergo aggregation and reformatting as they are transferred to the data warehouse. By way of an example, this may be a process of standard mapping where the data sets from the source (operational data) are mapped to the target database (e.g., data warehouse 104).

In the data warehouse 104, the process of the new mapping and extraction may take place. That means that the data sets (e.g., data sets 105) may be extracted out from the data warehouse into the portfolio management system 110 for use in the future processes, for example, related to analysis and planning. The data sets 105 received from the online transaction processing system may be stored in data structure, such as an Info-cube or multi-dimensional data model 106 of the SAP Business Information Warehouse.

An Info-cube may comprise a plurality of relational tables that are created according to the star schema: a large fact table in the center, with several dimension tables surrounding it. Data sets 105 received from the online transaction processing system can be also loaded into the info-objects 108. Each info-object (e.g., a SAP info-object) may have characteristics with attributes, texts, or hierarchies, and may function as a data source.

In the next step, the determination of a data structure representation for data sets stored in the data warehouse that conforms to the portfolio management system database schema may take place. A data structure representation for data sets stored in the data warehouse may be determined using a program module for filtering out the predetermined data sets 109, in order to accomplish the task of mapping the objects of the data warehouse onto the objects of portfolio management system database 112. The determination of the data structure representation for data sets stored in the data warehouse that conforms to the portfolio management system database schema may be done field-by-field and character-by-character to establish actual contents, and to determine acceptable data structures for organizing the data.

Thus, data sets 105 from source objects 108 located in the data warehouse 104 may be mapped onto target objects 116 of the portfolio management system database 112 and conversions to the data sets 105 may be optionally applied resulting in providing the filtered out data sets 115 that may be stored in the Info-cubes 114 (e.g., info-cubes of the SAP Dynamic Real Estate Analysis Model) and can be used in the future processes. Then, correlations between objects 108 of the data warehouse database 104 and objects 116 of the portfolio management system database 112 may be indicated. Also, mapping data types associated with objects of the data warehouse schema to data types supported by said portfolio management system database may take place. Data types may describe the technical attributes of data objects. They may be purely descriptive and may not take up any memory space.

The mapping from source objects located in the data warehouse onto target objects of the portfolio management system database can take place on an individual basis (manually or automatically), or on a mass scale. In both cases, one or more data warehouse objects may be mapped onto the portfolio management system objects using unique identification (a key). Manual mapping of source objects using GUI interface may allow a manager, for example, to group the objects for increasing their value. However, the mapping can also be done automatically, on a mass scale. In both cases, objects may usually be mapped with their hierarchies even though single objects can be taken out of the hierarchy if so requested.

After the transformations have been defined, and data is mapped from the objects of the data warehouse onto the target portfolio management system, scripts may be generated, which may convert and load data into target objects at run time for this specialized extraction. An extraction variant may be defined which joins together several fields. All fields that belong to one extraction variant may be extracted together.

Each extraction variant may be allocated a function module, for example, as shown below:

| EXTRACTION VARIANT | FUNCTION MODULE |
| --- | --- |
| CD_ACCSTCT | Z_REPF_CURRD_ACCSTCT |
| CD_VOACLO | Z_REPF_CURRD_VOACLO |
| CD_VOACRU | Z_REPF_CURRD_VOACRU |
| CD_VOACRU1 | Z_REPF_CURRD_VOACRU1 |
| CD_VOMDLO | Z_REPF_CURRD_VOMDLO |
| MD_CONTR | Z_REPF_EXTR_CONTRACT_EXTRACT |
| MD_RU | Z_REPF_EXTR_RENTUNIT_EXTRACT |
| MD_VLOBJ | Z_REPF_EXTR_VLOBJ_MD_EXTRACT |

However, different function modules including those especially customized for the customers can be assigned to the extraction variants. For all the extraction variants, the table structure may be the same. Further, attributes included in the table may also be evaluated.

Figure 2:
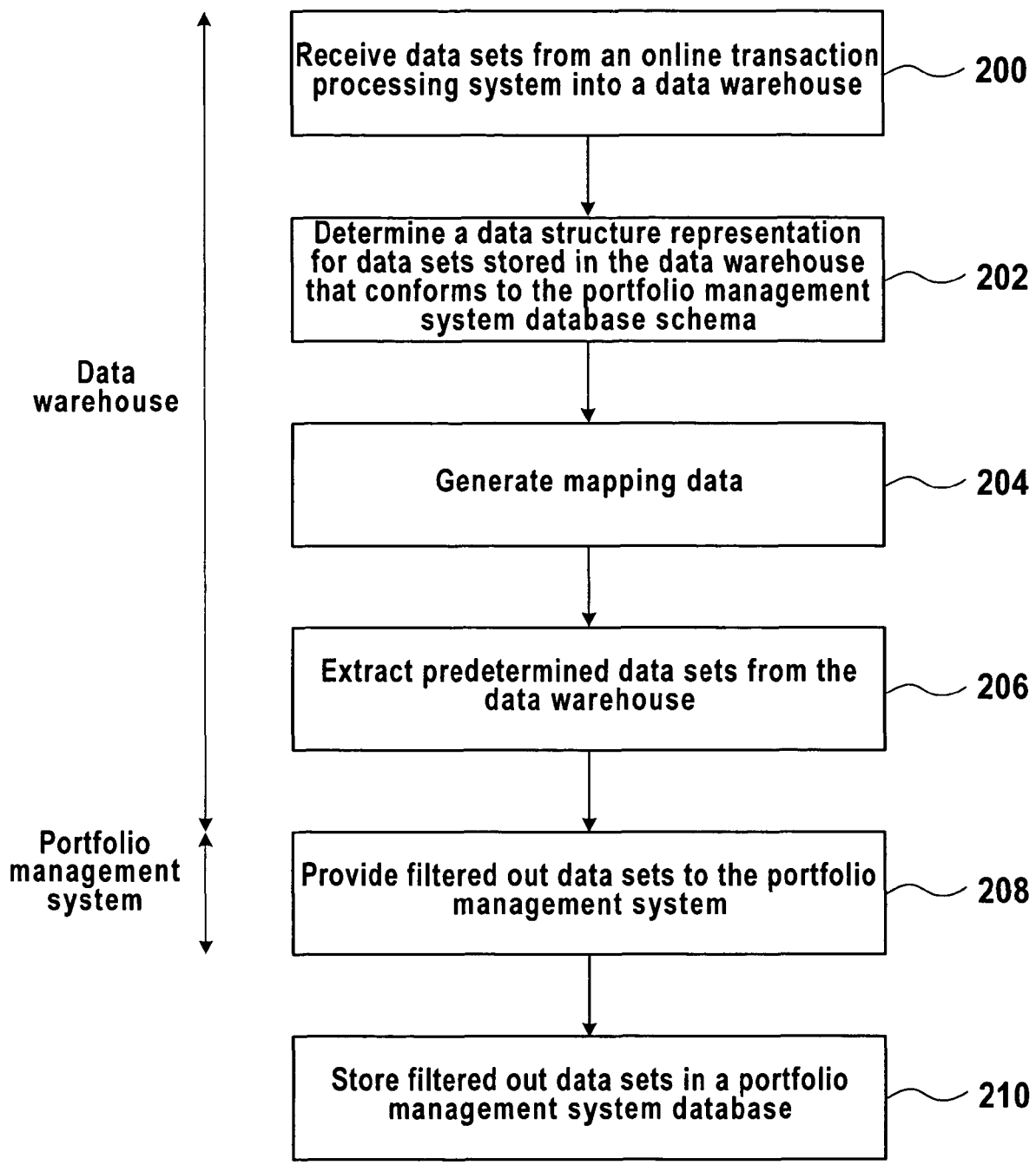
FIG. 2 is a flowchart of an exemplary process for managing an integrated database system, consistent with certain aspects of the present invention.

FIG. 2 is a flow chart illustrating steps of an exemplary method of providing data sets to the portfolio management system. In step 200, data sets from an online transaction processing system (e.g., 100 of FIG. 1) may be received in a data warehouse (e.g., 104 of FIG. 1). The data sets may be received as a result of a standard extraction process. In step 202, a data structure representation for data sets stored in the data warehouse conforming to the portfolio management system database schema may be determined. In one embodiment, a program module for filtering out the predetermined data sets (e.g., program module 109 of FIG. 1) may perform this step. Determining a data structure database representation may involve, for example, determining the database objects that are to be used by the database system. Determining a data structure representation may further include mapping data types associated with objects of the data warehouse schema onto the data types supported by the portfolio management system database.

Also, as part of this step, program module 109 for filtering out the predetermined data sets may create a cross reference, at the field level, of what data goes where. The next step 204, may involve generating mapping data. In other words, the required scripts may be generated, which perform the function of converting and loading data into target objects. In one embodiment, the program module 109 for filtering out the predetermined data sets may perform this step. The target objects may be portfolio management system objects (e.g., DREAM objects (Dynamic Real Estate Analysis Model) at run time). In step 206, the data sets may be extracted from the data warehouse. In one embodiment, the program module 109 for filtering out the predetermined data sets may perform this step.

Different extraction variants can be defined. The user may determine which extraction variant will be used. All fields that belong to one extraction variant may be extracted together and for all variants the table structure may be identical. In the next step 208, the filtered out data sets may be provided to the portfolio management system (e.g., system 110 of FIG. 1) for storage in the portfolio management system. In step 210, the filtered out data sets may be stored in a portfolio management system database. The stored data sets in the portfolio management system may be used in further processes.

Thus, embodiments of the present invention provide an integrated data warehouse data for use in the portfolio management system, allowing for the advanced analysis and reporting based on the consistent data. Also, since the integrated databases of online transaction processing, data warehouse and portfolio management system may use the same data, the duplication of data is avoided.

Figure 3:
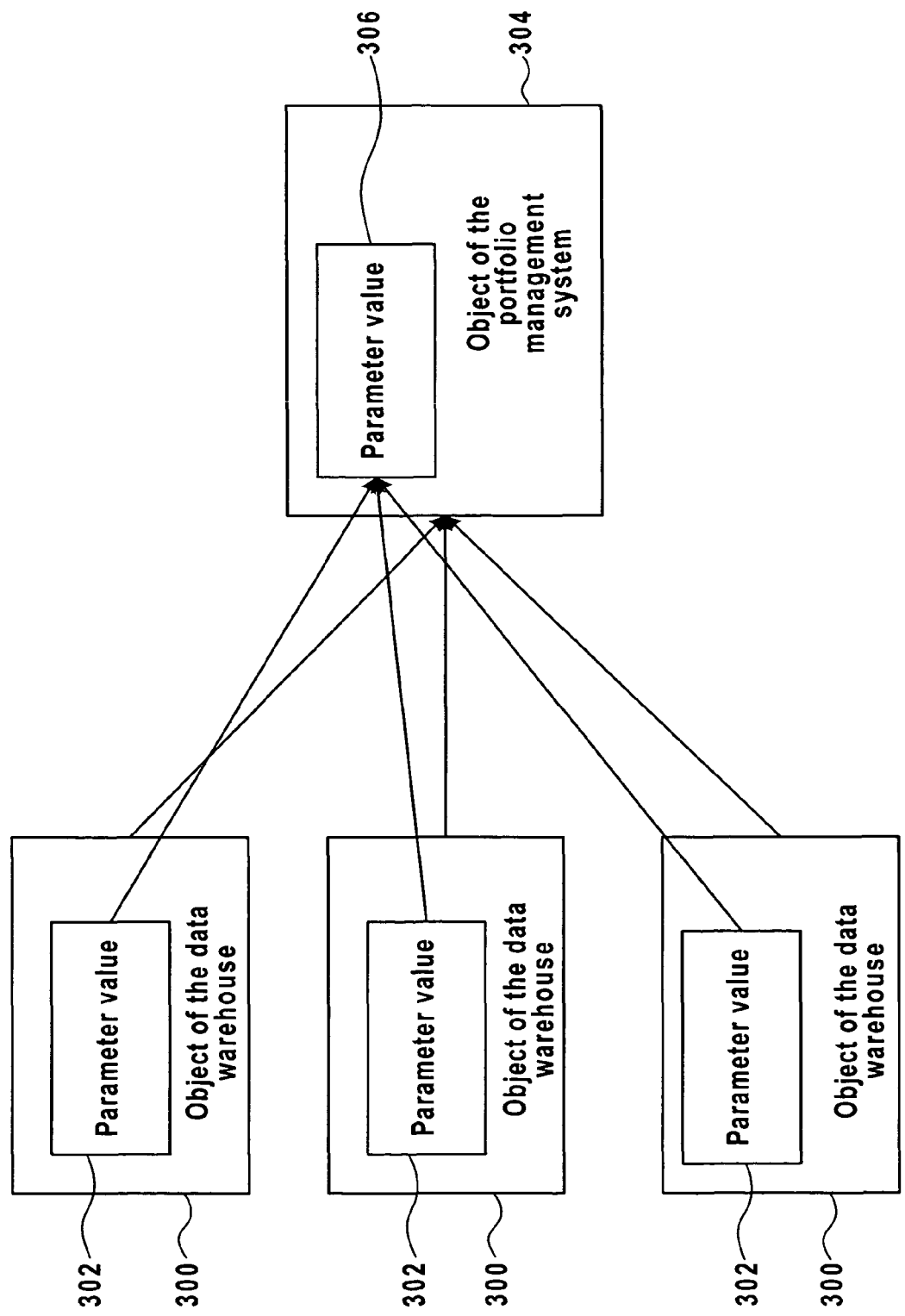
FIG. 3 illustrates exemplary mapping of objects from the data warehouse onto the objects of the portfolio management system, consistent with certain aspects of the invention.

FIG. 3 illustrates exemplary mapping of objects from data warehouse onto the objects of the portfolio management system, consistent with certain aspects of the invention. Specifically, FIG. 3 depicts the case when more than one info object 300 of the data warehouse is mapped onto an object of the portfolio management 304 and the mapped source objects have the same parameter values 302. (FIG. 3 shows three such exemplary info objects, each identified using reference numeral 300). In such a case, the mapping onto the target object parameter value 306 may be completed and the parameter value is extracted. However, another, not shown possibility exists when the source objects stored in the data warehouse have different parameter values. In this case, no parameter value may be extracted unless the user specifies which content should be extracted.

One skilled in the art will appreciate that the features of the present disclosure may be implemented in various data processing systems to provide data sets to a portfolio management system. Such environments and applications may be specially constructed for performing the various processes and operations of the disclosure or they may include a general-purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

What is claimed is:

1. A method for managing data in an integrated database system, the method comprising:
   receiving data sets from an online transaction processing system into a data warehouse;
   filtering, in the data warehouse, the data sets received from the online transaction processing system,
      wherein filtering comprises generating mapping data that indicates correlations between objects of a data warehouse database and objects of the portfolio management system database;
   determining a data structure representation for data sets stored in the data warehouse that conforms to a schema for a portfolio management system database;
   generating a cross-reference between field levels of the data sets, the cross-reference identifying a location for placing the filtered-out data sets;
   extracting the filtered-out data sets from the data warehouse; and
   storing the filtered-out data sets in the portfolio management system database, wherein a user can access data from the filtered-out data sets by querying the portfolio management system database.

2. The method of claim 1, further comprising extracting predetermined data sets from the data warehouse.

3. The method of claim 2, wherein extracting the predetermined data sets from the data warehouse includes extraction of all fields that belong to one extraction variant.

4. The method of claim 2, wherein extracting the predetermined data sets from the data warehouse includes using extraction variants having an identical table structure.

5. The method of claim 1, wherein determining the data structure representation includes determining, based on a predefined specification, that one or more objects of the data warehouse are to be mapped to an object within the portfolio management system database, and further wherein generating mapping data includes generating data that maps one or more of the data warehouse objects to the object within the portfolio management system database.

6. The method of claim 1, wherein determining the data structure representation includes mapping data types associated with objects in the data warehouse to data types supported by the portfolio management system database.

7. The method of claim 1, wherein determining the database representation includes defining an object type that includes parameter values that correspond to parameter values of at least one object in the portfolio management system database.

8. The method of claim 1, further comprising:
   defining a plurality of extraction variants;
   providing an option for selection of one of the extraction variants; and
   extracting the filtered-out data sets based on a selected extraction variant.

9. A system for managing data in an interconnected database system, the system comprising:
   means for receiving data sets from an online transaction processing system into a data warehouse;
   means for filtering, in the data warehouse, the data sets received from the online transaction processing system, wherein the means for filtering comprises means for generating mapping data that indicates correlations between objects of a data warehouse database and objects of the portfolio management system database;
   means for determining a data structure representation for data sets stored in the data warehouse that conforms to a schema for a portfolio management system database;
   means for generating a cross-reference between field levels of the data sets, the cross-reference identifying a location for placing the filtered-out data sets;
   means for extracting the filtered-out data sets from the data warehouse; and
   means for storing the filtered-out data sets in the portfolio management system database, wherein a user can access data from the filtered-out data sets by querying the portfolio management system database.

10. The system of claim 9, further comprising means for extracting predetermined data sets from the data warehouse.

11. The system of claim 9, further comprising:
   means for defining a plurality of extraction variants;
   means for providing an option for selection of one of the extraction variants; and
   means for extracting the filtered-out data sets from the data warehouse based on a selected extraction variant.

12. A computer-readable storage medium comprising program code for performing a method to manage data in an integrated database system, the method comprising:
   receiving data sets from an online transaction processing system into a data warehouse;
   filtering, in the data warehouse, the data sets received from the online transaction processing system, wherein filtering comprises generating mapping data that indicates correlations between objects of a data warehouse database and objects of the portfolio management system database;

determining a data structure representation for data sets stored in the data warehouse that conforms to a schema for a portfolio management system database;

generating a cross-reference between field levels of the data sets, the cross-reference identifying a location for placing the filtered-out data sets;

extracting the filtered-out data sets from the data warehouse; and storing the filtered-out data sets in the portfolio management system database, wherein a user can access data from the filtered-out data sets by querying the portfolio management system database.

13. The computer-readable storage medium of claim 12, wherein the method further comprises extracting predetermined data sets from the data warehouse.

14. The computer-readable storage medium of claim 12, wherein the method further comprises:

defining a plurality of extraction variants;

providing an option for selection of one of the extraction variants; and extracting the filtered-out data sets based on a selected extraction variant.

* * * * *